(12) United States Patent
McCabe et al.

(10) Patent No.: US 8,655,961 B2
(45) Date of Patent: Feb. 18, 2014

(54) SYSTEMS AND METHODS FOR DISTRIBUTED ELECTRONIC SIGNATURE DOCUMENTS

(75) Inventors: Andrew David McCabe, Indianola, WA (US); Thomas H. Gosner, Jr., Bellevue, WA (US)

(73) Assignee: DocuSign, Inc., Seattle, WA (US)

( * ) Notice: Subject to any disclaimer, the term of this patent is extended or adjusted under 35 U.S.C. 154(b) by 1010 days.

(21) Appl. No.: 12/490,602

(22) Filed: Jun. 24, 2009

(65) Prior Publication Data

US 2009/0292786 A1    Nov. 26, 2009

Related U.S. Application Data

(63) Continuation-in-part of application No. 12/176,265, filed on Jul. 18, 2008.

(60) Provisional application No. 60/950,563, filed on Jul. 18, 2007.

(51) Int. Cl.
*G06F 15/16* (2006.01)
*G06F 15/173* (2006.01)

(52) U.S. Cl.
USPC .......................................... 709/206; 709/224

(58) Field of Classification Search
USPC ................................. 709/206, 224
See application file for complete search history.

(56) References Cited

U.S. PATENT DOCUMENTS

| | | | |
|---|---|---|---|
| 5,220,675 A | 6/1993 | Padawer et al. | |
| 5,222,138 A | 6/1993 | Balabon et al. | |
| 5,337,360 A | 8/1994 | Fischer | |
| 5,390,247 A | 2/1995 | Fischer | |
| 5,465,299 A | 11/1995 | Matsumoto et al. | |
| 5,544,255 A | 8/1996 | Smithies et al. | |
| 5,553,145 A | 9/1996 | Micali | |

(Continued)

FOREIGN PATENT DOCUMENTS

| | | |
|---|---|---|
| KR | 1020020092595 | 12/2002 |
| KR | 1020070059931 | 6/2007 |
| WO | 9607156 | 3/1996 |

OTHER PUBLICATIONS

Wheeler et al., "DocuSign Unveils new Scalable Product and Support Offerings of Electronic Signature and Electronic Contract Execution," DocuSign The fastest way to get a signature, 2 pp., Jan. 2008.

(Continued)

*Primary Examiner* — Lynn Feild
*Assistant Examiner* — Lin Liu
(74) *Attorney, Agent, or Firm* — Lowe Graham Jones PLLC

(57) ABSTRACT

Systems and methods for providing a report describing the status of an electronic envelope. The electronic envelope includes a first electronic document to be distributed for electronic signature and an electronic signing template defining a set of at least one task that must be performed by an executor of the first electronic document to complete the electronic signature. The first electronic document is subject to a workflow including a plurality of events. The method includes receiving from a monitoring entity a selection of an identifier of an event of the plurality. The progress of the first electronic document through the workflow is monitored. That the at least one event has occurred with respect to the first electronic document is determined. In response to determining that the at least one event has occurred, the monitoring entity is notified of such.

19 Claims, 5 Drawing Sheets

(56) References Cited

U.S. PATENT DOCUMENTS

| | | | |
|---|---|---|---|
| 5,615,268 A | 3/1997 | Bisbee et al. | |
| 5,629,982 A | 5/1997 | Micali | |
| 5,689,567 A | 11/1997 | Miyauchi | |
| 5,748,738 A | 5/1998 | Bisbee et al. | |
| 5,813,009 A | 9/1998 | Johnson et al. | |
| 5,872,848 A | 2/1999 | Romney et al. | |
| 5,898,156 A | 4/1999 | Wilfong | |
| 6,021,202 A | 2/2000 | Anderson et al. | |
| 6,085,322 A | 7/2000 | Romney et al. | |
| 6,128,740 A | 10/2000 | Curry et al. | |
| 6,185,683 B1 | 2/2001 | Ginter et al. | |
| 6,199,052 B1 | 3/2001 | Mitty et al. | |
| 6,210,276 B1 | 4/2001 | Mullins | |
| 6,289,460 B1 | 9/2001 | Hajmiragha | |
| 6,321,333 B1 | 11/2001 | Murray | |
| 6,327,656 B2 | 12/2001 | Zabetian | |
| 6,367,010 B1 | 4/2002 | Venkatram et al. | |
| 6,367,013 B1 | 4/2002 | Bisbee et al. | |
| 6,470,448 B1 | 10/2002 | Kuroda et al. | |
| 6,584,466 B1 | 6/2003 | Serbinis et al. | |
| 6,615,348 B1 | 9/2003 | Gibbs | |
| 6,658,403 B1 | 12/2003 | Kuroda et al. | |
| 6,671,805 B1 * | 12/2003 | Brown et al. | 713/176 |
| 6,751,632 B1 | 6/2004 | Petrogiannis | |
| 6,796,489 B2 | 9/2004 | Slater et al. | |
| 6,807,633 B1 | 10/2004 | Pavlik | |
| 6,912,660 B1 | 6/2005 | Petrogiannis | |
| 6,931,420 B1 | 8/2005 | Silvester et al. | |
| 6,938,157 B2 | 8/2005 | Kaplan | |
| 6,944,648 B2 | 9/2005 | Cochran et al. | |
| 6,947,911 B1 | 9/2005 | Moritsu et al. | |
| 6,961,854 B2 | 11/2005 | Serret-Avila et al. | |
| 7,069,443 B2 | 6/2006 | Berringer et al. | |
| 7,100,045 B2 | 8/2006 | Yamada et al. | |
| 7,162,635 B2 | 1/2007 | Bisbee et al. | |
| 7,340,608 B2 | 3/2008 | Laurie et al. | |
| 7,360,079 B2 | 4/2008 | Wall | |
| 7,395,436 B1 | 7/2008 | Nemovicher | |
| 7,523,315 B2 | 4/2009 | Hougaard et al. | |
| 7,533,268 B1 | 5/2009 | Catorcini et al. | |
| 7,562,053 B2 | 7/2009 | Twining et al. | |
| 7,568,101 B1 | 7/2009 | Catorcini et al. | |
| 7,568,104 B2 | 7/2009 | Berryman et al. | |
| 7,581,105 B2 | 8/2009 | Dietl | |
| 8,103,867 B2 * | 1/2012 | Spitz | 713/150 |
| 2002/0019937 A1 | 2/2002 | Edstrom et al. | |
| 2003/0078880 A1 * | 4/2003 | Alley et al. | 705/38 |
| 2004/0225884 A1 | 11/2004 | Lorenzini et al. | |
| 2006/0205476 A1 | 9/2006 | Jubinville | |
| 2006/0259440 A1 * | 11/2006 | Leake et al. | 705/76 |
| 2006/0261545 A1 | 11/2006 | Rogers | |
| 2007/0026927 A1 | 2/2007 | Yaldoo et al. | |
| 2008/0034213 A1 | 2/2008 | Boemker et al. | |
| 2008/0209313 A1 | 8/2008 | Gonser | |
| 2009/0024912 A1 | 1/2009 | McCabe et al. | |
| 2009/0025087 A1 * | 1/2009 | Peirson et al. | 726/27 |
| 2009/0292786 A1 | 11/2009 | McCabe | |

OTHER PUBLICATIONS

Borozdin, "DocuSign Connect Service Guide," DocuSign, Inc., pp. 1-9, 2008.

"eLynx Adds Workflow Management to Electronic Document Platform—new Workflow Capabilities Provide for Enhanced Electronic Loan Processing," eLynx, http://www.elynx.com/news/view/82, 2 pp., Jan. 2009.

* cited by examiner

ACCOUNT: 2563 | SYSTEM OVERVIEW | SUPPORT | LOGOUT

VIEW DOCUSIGN CONNECT FOR
○ Salesforce.com
◉ Custom URL: http://blastzone.com/docusign/Listener.ashx   ⎱ 340
○ Second Custom URL URL to publish to: http:// [blastzone.com/docusign/listener.ashx]  ☒ INCLUDE DOCUMENTS
Clear the URL field to disable the Publish.

SEND INFORMATION ON THESE ENVELOPE EVENTS
select all  clear all
310

☒ ENVELOPE SENT
☒ ENVELOPE DELIVERED
☒ ENVELOPE SIGNED
☒ ENVELOPE COMPLETED
☒ ENVELOPE DECLINED
☒ ENVELOPE VOIDED

SEND INFORMATION ON THESE RECIPIENT EVENTS
select all  clear all
320

☒ RECIPIENT SENT
☒ RECIPIENT DELIVERED
☒ RECIPIENT SIGNED/COMPLETED
☒ RECIPIENT DECLINED

SELECT USERS TO INTEGRATE
select all  clear all
330

☐ AARON WALD
☐ ANDY EVANS
☐ BOB DeSANTIS
☐ BRAD EPKER
☐ BRIAN BROWN
☐ BRIT SKINNER
☐ BRYAN BRIGHT

[ SAVE ]  [ SAVE & CLOSE ]  [ CANCEL ]

ROOT > MAIN LIST

TIP: CLICK ON AN ENVELOPE ID TO GET A RAW XML ☑ TURN ON | OFF LISTENER

400 ⟶

ENVELOPES

| CHK | ENVELOPEID | STATUS | COMPANY | SIGNER | SENDER | DATESENT | DATE COMPLETED | HOURS TO COMPLETE | DETAILES |
|---|---|---|---|---|---|---|---|---|---|
| ☐ | 262e126a-5726-43f2-b550-44222325b8fd | DELIVERED | | JEFF RAINES | DOCUSIGN POST OFFICE | 4/29/2009 5:57:23 AM | | | [OPEN] |
| ☐ | 7636c24f-ef20-457c-baf4-2a4032964ea0 | COMPLETED | | TUCKER | DOCUSIGN POST OFFICE | 4/29/2009 6:48:57 AM | 4/29/2009 6:49:45 AM | 00:00:48 | [OPEN] |
| ☐ | c3253ac9-e429-479d-aebe-49e757e2635b | COMPLETED | | AJAY SHARMA | DOCUSIGN POST OFFICE | 4/29/2009 8:19:44 AM | 4/29/2009 8:23:37 AM | 00:03:52 | [OPEN] |
| ☐ | 33c50f7d-549e-4748-9259-9b41001c7d95 | SENT | | GINA | DOCUSIGN POST OFFICE | 4/29/2009 8:24:53 AM | | | [OPEN] |
| ☐ | 4de81dad-f7f4-4a12-8cfc-b212d44a7421 | COMPLETED | | DILLANA | DOCUSIGN POST OFFICE | 4/29/2009 10:20:51 AM | 4/29/2009 10:23:26 AM | 00:02:35 | [OPEN] |
| ☐ | 6b8a0512-aea6-4ea6-807c-49e2db628064 | SENT | | DARRELL R. STEELE | DOCUSIGN POST OFFICE | 4/29/2009 2:59:28 PM | | | [OPEN] |
| ☐ | 491105a8-8b5b-4c0b-96b1-c549b6d746b | DELIVERED | | DUDU | DOCUSIGN POST OFFICE | 4/30/2009 2:13:03 AM | | | [OPEN] |
| ☐ | 756c928d-5003-4168-9acd-c6225d143817 | COMPLETED | | TRACE BELL | DOCUSIGN POST OFFICE | 4/30/2009 7:21:11 AM | 4/30/2009 7:25:49 AM | 00:04:37 | [OPEN] |
| ☐ | 26436675-68ec-4de4-9f65-b09b8a99-9e6 | COMPLETED | | DAVE | DOCUSIGN POST OFFICE | 4/30/2009 7:57:11 AM | 4/30/2009 8:02:16 AM | 00:05:05 | [OPEN] |

[...|10|11|12|13|14|15|16|17|18|19|

410

DELETE CHECKED

FIG. 4

| ROOT > MAIN LIST > DETAILS LIST | | | | | |
|---|---|---|---|---|---|
| GENERAL | | | | | |
| RECIPIENTS | | | | | |
| DOCUMENTS | | | | | |
| FIELDS | | | | | |
| TAB TYPE | STATUS | TAB NAME | TAB LABEL | TAB VALUE | ASSIGNEDTO |
| DATESIGNED | SIGNED | | DATE SIGNED | 4/30/2009 | TED SMITH |
| CUSTOM | SIGNED | ENTER COMPANY NAME | COMPANYN | TOM GOSNER | TED SMITH |
| CUSTOM | SIGNED | INSTRUCT | INSTRUCTIONONLY | (COMPANY NAME) | TED SMITH |
| CUSTOM | SIGNED | --SELECT TOPIC--;THE ENVIRONMENT; THE ECONOMY;FASHION;SPORTS;TECHNOLOGY | DEMONDATOPIC | FASHION | TED SMITH |
| CUSTOM | ACTIVE | NO | OTHERSERVICES | | TED SMITH |
| CUSTOM | SIGNED | YES | OTHERSERVICES | X | TED SMITH |
| CUSTOM | SIGNED | WHAT OTHER ESIGN SYSTEM DO YOU USE ? | OTHERESIGN | A GOOD ONE | TED SMITH |
| CUSTOM | SIGNED | --CHOOSE INDUSTRY--;COMMUNICATION; DEBT ASSISTANCE;ENTERTAINMENT;FINANCE;HEALTH CARE; INSURANCE;INTERNET;IT;LEASING;MANUFACTURING; MORTGAGE;REAL ESTATE;PHARMACEUTICALS; PROPERTY RENTAL;TECHNOLOGY;OTHER | INDUSTRY | HEALTH CARE | TED SMITH |
| CUSTOM | SIGNED | NO | DEMOHELPFUL | X | TED SMITH |
| CUSTOM | SIGNED | TELL US WHY THIS WAS NOT HELPFUL | WHYNOTHELPFUL | I ALREADY SAW THE MOVIE | TED SMITH |
| INITIALHERE | SIGNED | | | | TED SMITH |
| CUSTOM | ACTIVE | YES | DEMOHELPFUL | | TED SMITH |
| CUSTOM | SIGNED | DATA FIELD | DATA FIELD 2 | NOPE | TED SMITH |
| CUSTOM | SIGNED | ENTER COMPANY NAME | COMPANYN | TOM GONSER | TED SMITH |
| SIGNHERE | SIGNED | | | | TED SMITH |
| CUSTOM | SIGNED | DATA FIELD | DATA FIELD 1 | THANKS FOR VALIDATING YOUR EMAIL; IF YOUR BUSINESS REQUIRES ADDITIONAL LEVELS OF AUTHENTICATION, THEY CAN BE PROVIDED. | TED SMITH |
| CUSTOM | SIGNED | NO | WANT MORE INFO | X | TED SMITH |

FIG.5

SYSTEMS AND METHODS FOR DISTRIBUTED ELECTRONIC SIGNATURE DOCUMENTS

PRIORITY CLAIM

This application is a continuation-in-part of U.S. application Ser. No. 12/176,265 filed Jul. 18, 2008, which claims priority to and the benefit of the filing date of U.S. Provisional Application Ser. No. 60/950,563 filed Jul. 18, 2007, which is incorporated by reference in its entirety.

BACKGROUND OF THE INVENTION

Email is a popular way of transferring contract documents in the marketplace. Currently, there does not exist an effective system or method for a person to email a document or file to another person and have them fill-in and sign the document in such a way as to enforce a legally binding electronic signature process.

In order to create a legally binding document, the signer must be authenticated, the document may not be modified and the sequence of signing must be controlled. Standard email systems lack the control over any of these processes. One current method is emailing a PKI signed document. A PKI signed document can be cumbersome because it requires the document to be signed by the sender before it is distributed, then again by the signer when they sign the document, and further requires all parties to have special software and certificates to execute the process. This requirement that all parties pre-establish proper technology in order execute a transaction adds extra burden and cost on both parties to the transaction, which severely limits acceptance of PKI in the marketplace.

Advanced electronic signature services such as DocuSign® enable contracts to be signed with an ESIGN-compliant signature process. However, this service lacks the ability to simply email the source document to a person to sign; it requires the signer to visit and authenticate before they sign the document. It further requires the sender to register each document with the service prior to sending it for signature.

SUMMARY OF THE INVENTION

Systems and methods for providing a report describing the status of an electronic envelope are disclosed. The electronic envelope includes a first electronic document to be distributed for electronic signature and an electronic signing template defining a set of at least one task that must be performed by an executor of the first electronic document to complete the electronic signature. The first electronic document is subject to a workflow including a plurality of events. The method includes receiving from a monitoring entity a selection of an identifier of an event of the plurality. The progress of the first electronic document through the workflow is monitored. That the at least one event has occurred with respect to the first electronic document is determined. In response to determining that the at least one event has occurred, the monitoring entity is notified of such.

BRIEF DESCRIPTION OF THE DRAWINGS

The preferred and alternative embodiments of the present invention are described in detail below with reference to the following drawings:

FIG. 3 shows a user interface for customizing status reports according to an embodiment;

FIG. 4 shows a first status report according to an embodiment; and

FIG. 5 shows a second status report according to an embodiment.

DETAILED DESCRIPTION OF THE PREFERRED EMBODIMENT

Systems and methods for distributed electronic signature documents are disclosed herein. One embodiment of the present invention acts like a "Self Addressed Stamped Envelope" and allows a document to be sent for signature via email. Once the signer receives the document, he/she may fill in necessary fields prior to signing. When the signer is ready to sign, a control embedded in the document enables the signing process to be initiated by the signer and the signing managed by a web service. The web service authenticates the signer and ensures that the content of the contract can/cannot be modified (determined by the creator of the document). The service preferably enforces the workflow and sequencing of the document and adds any fields to the document that the signer added during review and execution. This approach allows any document to be distributed freely for signature via any means along with the ability to be electronically signed without the need for special software or certificates, and there is no requirement for the sender to take specific actions for each document, but rather allows the document to be distributed freely. In a preferred embodiment, the same signable document may be sent to hundreds of recipients via email, each of which may sign their copy, with the result being that all signed copies and all the data provided by the signed copies is securely captured and available to the sender.

Embodiments of the invention may incorporate concepts described in commonly owned U.S. patent application Ser. No. 12/038,728 entitled "SYSTEM AND METHOD FOR DOCUMENT TAGGING TEMPLATES," which is hereby incorporated by reference as if fully set forth herein.

Figure 1:
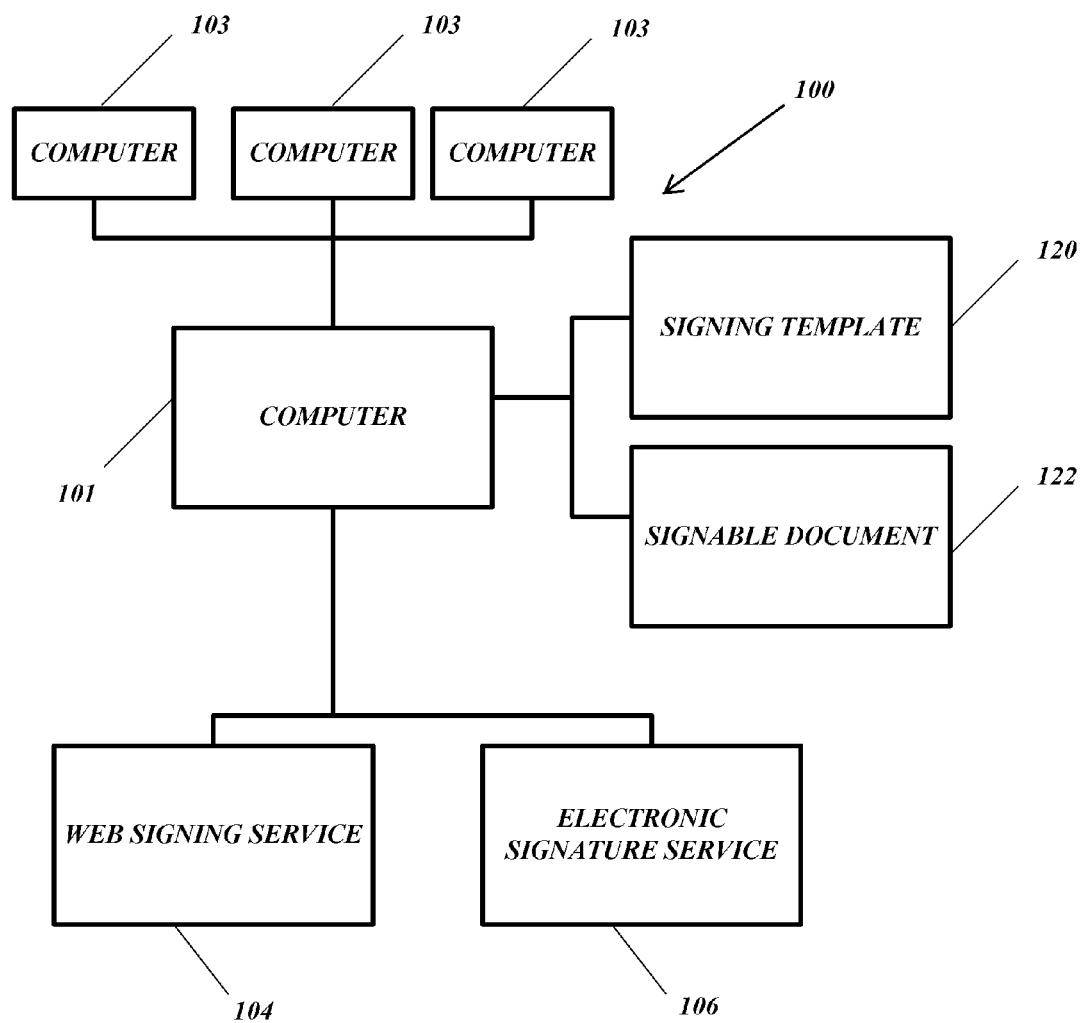
FIG. 1 shows an example system for creation, processing and execution of distributed electronic signature documents.

FIG. 1 shows an example system 100 for creation, processing and execution of distributed electronic signature documents. The system 100 includes a single computer 101, or includes a computer 101 in communication with pluralities of other computers 103. The computer 101 is connected with a web signing service 104 and an electronic signature service 106 over a network such as the Internet. In one embodiment, a bank of servers, a wireless device, a cellular telephone and/or other data capture/entry device can be used in place of the computer 101. An application program, such as a source-client application, is run by the computer 101, which then creates a signing template 120 and/or a signable document 122. The computer 101 can include an application program that allows the signing template 120 and/or the signable document 122 to be sent for signature via email.

The signing template 120 is a file that preferably contains information about the signing process, locations, sequence and authentication. It contains links to any form fields in the signable document that will be used to fully execute the signing template. It may also contain information about the account holder and any limitations on the signing process. It may identify other parties that will also sign, as well as any authentication requirements for any of the signers. The signable document 122 is a document file that preferably contains text and/or graphics along with a customizable control or link (e.g., tag) back to the signing template for execution. The web signing server 104 is a web server on the Internet that preferably hosts the application logic to correlate data transmitted by the embedded control in the signable document 122 with signing template 120 rule sets. An electronic signature service 106, such as the existing DocuSign service, executes the signing template instructions through the web signing server.

Figure 2:
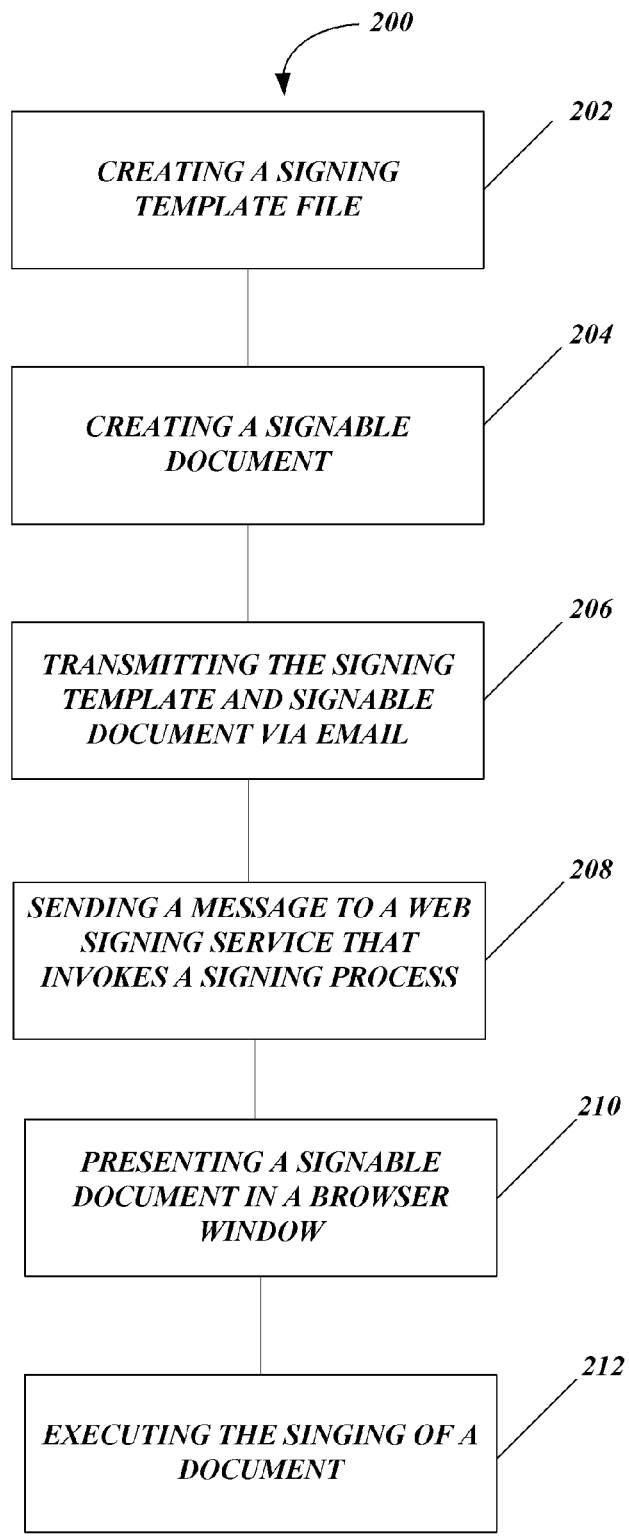
FIG. 2 shows a preferred method for distributed electronic signature documents.

FIG. 2 shows a method for distributed electronic signature documents 200 in one embodiment. At block 202 a document originator creates a signing template file that contains information about how a signable document is to be signed. A document originator may be a user, a party to a transaction, an agency or any entity interested in creating a signable document. The signing template file may include but is not limited to the location of signatures and initials for one or more signers; linkage between form fields in the actual document; information to be used to notify or authenticate the signer; information that may be used by decision systems to decide on different signature execution processes based on what is entered into the document during the signing process; the number of times the signable document can be executed; who will pay for the signature process; information governing whether the signable document content is modifiable by the signer; and other controlling information that may be changed or modified at any time by the sender who has access to it on the web server connected to the Internet. The signing template is preferably stored on a web signing server that is connected to the Internet.

In one embodiment, at block 204, the document originator may create a signable document that is to be distributed to recipients for signing or viewing. The creation of the signing template and signable document preferably occurs in the same application, but may also occur in a different sequence and in different applications. The core signable document preferably includes an embedded control that provides information about the companion signing template. This information is similar to a secure hyperlink that enables the signer to click a button ("SDButton") or a link in the signable document that contains information about how to connect over the Internet to the signing template for processing. The signable document is preferably paired with a signing template; however, there may be multiple signable documents relating back to one or more Signable Templates.

The document originator, at block 206, transmits electronically the signing template and signable document to the signer. In an alternative embodiment, the signing template may be distributed via a simple hyperlink back to the signable document stored on a web server available to the Internet. When the signer is ready and when the SDButton is activated, at block 208, a message is sent to the signing template on the web signing server, which invokes a signing process. This signing process preferably launches a procedure that validates the transaction and uploads the data provided by any form fields in the signable document to the web signing server and invokes a signing process that spawns a local web browser on the signer's computer and begins a signing process as defined by the signing template.

After the signer has been authenticated by the system by any means defined in the signing template, at block 210 a version of the signable document that is created from the server is presented in the browser window. The signing process uses the current method of signing found in the DocuSign service, but may accommodate alternative methods of signing found in similar services. At block 212, the signer signs the document.

Preferably only the form field data from the signer is uploaded to the server and merged into the signing template (which contains the signable document copy). In this embodiment, the signers are not able to modify the underlying documents because this data is not used when the contract is presented to them during the signing process.

In an alternative embodiment, if the sender allows the content to be modified prior to submitting to the web signing server for signing, the entire signable document rather than only the field information is uploaded to the web signing server for handling through the signing process. In this embodiment, the modified document is displayed for the signer to sign in the web signing server.

In another embodiment, the sender does not allow the content to be modified and the entire document is posted to the web signing server for the signing process. Next, a document integrity validation occurs on the posted document to ensure that the underlying content has not been changed.

Once a signable document/signing template pairing has been created, the signable document can be used in many different ways to enable businesses to easily allow electronic signatures to be collected. The following provide non-limiting examples of alternative embodiments as may be desired or dictated by application requirements.

In one example, a business creates a signable document for the company 401k signing sheet and emails it to multiple employees. Each employee opens the file and fills in the form, clicking a button that may say "Sign." The web signing server responds by presenting a web interface that authenticates and presents the document for signature for each employee and collects the signature and any data provided.

In another example, a business creates a signable document for a sales order form and creates the companion signing template, which requests that after the original signer has signed the document must be countersigned internally by two other people before being completed. To execute a sales transaction, the sales representative opens the document, enters in the data required for the sale, and sends the file to the signer for signature. The signer merely clicks the "Sign" button. The web signing server responds by presenting a web interface that authenticates and provides the document for signature to the first signer. Once the first signer has signed, the document is routed to the other two signers for signatures before it is completed.

A business creates a signable document that is unlocked (i.e. the content is changeable) for the company consulting agreement, and a signing template with instructions about the signing process, which ensures the company signer signs second. This contract is edited by both the company and consultant several times before it is deemed to be the final copy. Once the final copy is reached, either party may click the "Submit for Signature" link or button and the web signing server manages the signing process.

A company has an "Account Setup Form" that currently prospects download, print and fill out manually, and faxing the form back to the company for account setup. Using the systems and methods described herein, the sender company creates the form as a signable document linked to a signing template that defines the signing process for opening an account. When the user clicks on a hyperlink on a webpage that says "Open Account," the form is displayed in the browser window, and the user fills out the form using all form fields defined in the signable document (for example a PDF form). When the user clicks "Sign" the web signing server executes the signing process for the document.

Embodiments of the invention include methods and systems for providing a report describing the status of an electronic envelope including one or more electronic documents distributed for electronic signature. Elements of the system 100 may include one or more computer-readable media having stored thereon instructions that, when executed by one or more elements of system 100, enable such elements to implement the described embodiments. For purposes of the present discussion, an envelope may be considered to be a grouping of pre-tagged documents and/or standalone documents, along with associated templates, if any. As such, the electronic envelope may further include an electronic signing template defining one or more tasks that must be performed by an executor of the one or more electronic documents to complete the electronic signature. As discussed herein above, the one or more electronic documents may be subject to a document-execution workflow that includes a plurality of events, which may include the one or more tasks associated with the template.

In an embodiment, a user desiring to monitor the status of electronically signable documents distributed in association with a particular account (e.g., documents distributed by a particular company or individual) may use computer 101, for example, to access information associated with such account, which may be maintained by the administrator of web signing server 104 and/or electronic signature service 106. For example, the user may access a website maintained by such administrator and provide authentication information to access the account in a conventional manner.

Upon accessing the account, and as illustrated in FIG. 3, the administrator may provide to the computer 101 a webpage 300 providing a graphical user interface allowing the user to customize document-monitoring reports. As illustrated in FIG. 3, the page 300 includes a field 310 allowing the user to select from among a number of workflow events (e.g., envelope delivered, envelope signed, etc.) pertaining to all, or a user-selectable set, of the envelopes/documents distributed in association with the account. As such, if, for example, the user selected only the "Envelope Sent" and "Envelope Signed" identifiers in field 310, the user would receive progress reports only upon the occasion of an envelope having been sent and upon the occasion of the envelope having been digitally signed.

As further illustrated in FIG. 3, the page 300 includes a field 320 allowing the user to select from among a number of workflow events (e.g., recipient delivered, recipient signed, etc.) pertaining to all, or a user-selectable set, of the recipients to whom envelopes/documents have been distributed in association with the account. As such, if, for example, the user selected only the "Recipient Sent" and "Recipient Signed" identifiers in field 320, the user would receive progress reports only upon the occasion of an envelope having been sent to a particular recipient or set of recipients and upon the occasion of the envelope having been digitally signed by a particular recipient or set of recipients.

As further illustrated in FIG. 3, the page 300 includes a field 330 allowing the user to select from among a number of individuals associated with the account who have distributed envelopes/documents. As such, by selecting identifiers of particular individuals in field 330, the user would receive progress reports only upon the occasion of events selected in fields 310, 320 occurring with regard to documents distributed by the selected individuals.

As further illustrated in FIG. 3, the page 300 includes a field set 340 allowing the user to select from among a number of predetermined destinations, or to designate a desired destination, to which status reports may be published or sent.

After the user has made and saved his selections using page 300, the web signing server 104 functions to monitor the progress of each electronic envelope/document as it passes through the workflow. For example, using techniques described elsewhere herein, elements of the system 100 are operable to determine when a tab or other activatable control within a document has been activated (e.g., a document has been electronically signed and/or initialed). Upon determining that a selected event has occurred with respect to an electronic document, the web signing server 104 prepares and publishes a report of the event to the destination designated by the user in field 340 of page 300. FIG. 4 illustrates a webpage 400 associated with the designated report destination listing the envelopes for which selected events have occurred, and providing several types of exemplar information including the status of the envelope, the name of the person who has signed or will be signing the associated document(s), dates of sending and execution of the document(s), and the time elapsed between sending and execution, or delivery and execution) of the document(s). The user can select a link from "EnvelopeID" field 410 to view a more detailed status report pertaining to an associated envelope/document, as illustrated in FIG. 5. In the case of an electronic envelope containing more than one document, such status reports are operable to inform the user of the status of each individual document (e.g., that one document has been signed, while the other has not, and an identification of the signed document).

The report shown in FIG. 5 is in the form of a webpage 500 and provides, among other information, descriptions 510 of the tabbed fields present in the document, the status (e.g., signed, unsigned, not otherwise executed, etc.) 520 of each tabbed field, and identifications 530 of the values assigned by the signer to each tabbed field.

While the preferred embodiment of the invention has been illustrated and described, as noted above, many changes can be made without departing from the spirit and scope of the invention. Accordingly, the scope of the invention is not limited by the disclosure of the preferred embodiment, but to the invention as described above and illustrated in the exemplars shown below.

The embodiments of the invention in which an exclusive property or privilege is claimed are defined as follows:

1. A system, comprising:
a source client executable on a first computing device, the source client configured to generate an electronic envelope including a first electronic document to be distributed over a network for electronic signature and an electronic signing template defining a set of at least one task that must be performed by an executor of the first electronic document to complete the electronic signature, the first electronic document being subject to a document-execution workflow comprising a plurality of events including the at least one task, the first electronic document including an embedded activatable control; and
an electronic device coupled to the first computing device over the network, the electronic device configured to:
receive from the first computing device an electronic selection of an identifier of at least one event of the plurality of events, wherein the electronic selection of the identifier is provided via a graphical user interface that is configured to:
display identifiers of the plurality of events including envelope sent, envelope delivered, and envelope signed,
receive selections of identifiers of each of the plurality of events, and
receive from a user a selection of an identifier of the at least one event of the plurality of events,
monitor, over the network, progress of the first electronic document through the workflow, determine that the at least one event has occurred with respect to the first electronic document, by receiving an indication that the control has been activated, and in response to determining that the at least one event has occurred with respect to the first electronic document, notify the first computing device that the at least one event has occurred with respect to the first electronic document.

2. The system of claim 1, wherein:

the source client is further configured to embed into the first document the activatable control; and the electronic device is further configured to determine that the event has occurred in response to receiving an indication that activated user has clicked a button in the first electronic document.

3. The system of claim 1, wherein the electronic envelope includes a second electronic document to be distributed for electronic signature, and the electronic device is further configured to:

monitor the progress of the second electronic document through the workflow;

determine that the at least one event has occurred with respect to the second electronic document; and in response to determining that the at least one event has occurred with respect to the second electronic document, notify the first computing device that the at least one event has occurred with respect to the second electronic document.

4. The system of claim 1, wherein the electronic device is further configured to generate the graphical user interface to a display device associated with the first computing device, wherein the identifier selection is provided by a user of the first computing device via the graphical user interface.

5. The system of claim 1, wherein the at least one event comprises completion of the electronic signature of the first electronic document.

6. The system of claim 1, wherein the electronic device is further configured to receive from the first computing device a selection of a first destination of a plurality of destinations to be notified that the at least one event has occurred with respect to the first electronic document.

7. A method for providing a report describing a status of an electronic envelope including a first electronic document to be distributed for electronic signature and an electronic signing template defining a set of at least one task that must be performed by an executor of the first electronic document to complete the electronic signature, the first electronic document being subject to a document-execution workflow comprising a plurality of events including the at least one task, the first electronic document including an embedded activatable control, the method comprising:

receiving from a monitoring entity an electronic selection of an identifier of at least one event of the plurality of events, wherein the electronic selection of the identifier is provided via a graphical user interface that is configured to:

display identifiers of the plurality of events including envelope sent, envelope delivered, and envelope signed;

receive selections of identifiers of each of the plurality of events; and receive from a user a selection of an identifier of the at least one event of the plurality of events;

monitoring, over a network, progress of the first electronic document through the workflow;

determining that the at least one event has occurred with respect to the first electronic document, by receiving an indication that the control has been activated; and in response to determining that the at least one event has occurred with respect to the first electronic document, notifying the monitoring entity that the at least one event has occurred with respect to the first electronic document.

8. The method of claim 7, wherein:

receiving the indication that the control has been activated includes receiving an indication that a user has clicked a button in the first electronic document.

9. The method of claim 7, wherein the electronic envelope includes a second electronic document to be distributed for electronic signature, and further comprising:

monitoring the progress of the second electronic document through the workflow;

determining that the at least one event has occurred with respect to the second electronic document; and in response to determining that the at least one event has occurred with respect to the second electronic document, notifying the monitoring entity that the at least one event has occurred with respect to the second electronic document.

10. The method of claim 7, further comprising generating the graphical user interface to a display device associated with the monitoring entity, wherein the identifier selection is provided by the monitoring entity via the graphical user interface, wherein the graphical user interface is further configured to:

receive a selection of one or more users to notify when it is determined that the at least one event has occurred.

11. The method of claim 10, wherein the graphical user interface is further configured to receive an indication of a destination to which to publish a status report regarding the electronic envelope, wherein the indication of the destination is a uniform resource locator that identifies a Web service, and further comprising publishing the status report to the destination when it is determined that the at least one event has occurred with respect to the first electronic document.

12. The method of claim 7, wherein the at least one event comprises completion of the electronic signature of the first electronic document.

13. The method of claim 7, further comprising receiving from the monitoring entity a selection of a first destination of a plurality of destinations to be notified that the at least one event has occurred with respect to the first electronic document.

14. A non-transitory computer readable medium including instructions that, when executed by an electronic device, enable the electronic device to perform steps for providing a report describing a status of an electronic envelope including a first electronic document to be distributed for electronic signature and an electronic signing template defining a set of at least one task that must be performed by an executor of the first electronic document to complete the electronic signature, the first electronic document being subject to a document-execution workflow comprising a plurality of events including the at least one task, the first electronic document including an embedded activatable control, the steps comprising:

receiving from a monitoring entity an electronic selection of an identifier of at least one event of the plurality of events, wherein the electronic selection of the identifier is provided via a graphical user interface that is configured to:

display identifiers of the plurality of events including envelope sent, envelope delivered, and envelope signed;

receive selections of identifiers of each of the plurality of events; and receive from a user a selection of an identifier of the at least one event of the plurality of events;

monitoring, over a network, progress of the first electronic document through the workflow;

determining that the at least one event has occurred with respect to the first electronic document, by receiving an indication that the control has been activated; and in response to determining that the at least one event has occurred with respect to the first electronic document, notifying the monitoring entity that the at least one event has occurred with respect to the first electronic document.

15. The non-transitory computer readable medium of claim 14, wherein:

receiving the indication that the control has been activated includes receiving an indication that a user has clicked a button in the first electronic document.

16. The non-transitory computer readable medium of claim 14, wherein the electronic envelope includes a second electronic document to be distributed for electronic signature, and wherein the steps further include:

monitoring the progress of the second electronic document through the workflow;

determining that the at least one event has occurred with respect to the second electronic document; and in response to determining that the at least one event has occurred with respect to the second electronic document, notifying the monitoring entity that the at least one event has occurred with respect to the second electronic document.

17. The non-transitory computer readable medium of claim 14, wherein the steps further include generating the graphical user interface to a display device associated with the monitoring entity, wherein the identifier selection is provided by the monitoring entity via the graphical user interface.

18. The non-transitory computer readable medium of claim 14, wherein the at least one event comprises completion of the electronic signature of the first electronic document.

19. The non-transitory computer readable medium of claim 14, wherein the steps further include receiving from the monitoring entity a selection of a first destination of a plurality of destinations to be notified that the at least one event has occurred with respect to the first electronic document.

\* \* \* \* \*